United States Patent

Washbourn

[15] 3,706,480
[45] Dec. 19, 1972

[54] BRAKE CONTROL VALVE APPARATUS

[72] Inventor: Jack Washbourn, London, England

[73] Assignee: Westinghouse Brake and Signal Company, Limited, London, England

[22] Filed: Feb. 16, 1971

[21] Appl. No.: 115,651

[30] Foreign Application Priority Data

March 19, 1970 Great Britain.....................13,302/70

[52] U.S. Cl......................................303/36, 303/69
[51] Int. Cl. ..............................................B60t 15/52
[58] Field of Search..........................303/33, 36–38, 303/69, 70, 85

[56] References Cited

UNITED STATES PATENTS 1,879,643   9/1932   Thomas..................................303/69
2,939,746   6/1960   Pickert....................................303/70
3,175,869   3/1965   Kirk.....................................303/36 X
3,472,562  10/1969   Washbourn.........................303/33 X Primary Examiner—Duane A. Reger
Attorney—Larson, Taylor & Hinds

[57] ABSTRACT

An improved form of triple valve for control of fluid braking has a charged accelerated release reservoir which is connectable to the brake pipe the pressure in which is controlling the triple valve on release of the brakes to assist such release and the propagation of the release along a train having a succession of such triple valves on the same brake pipe. The accelerated release is piloted by brake cylinder exhaust pressure transients being used to control a pressure responsive device to briefly operate an accelerated release valve which connects the accelerated releaser reservoir to the brake pipe.

3 Claims, 1 Drawing Figure

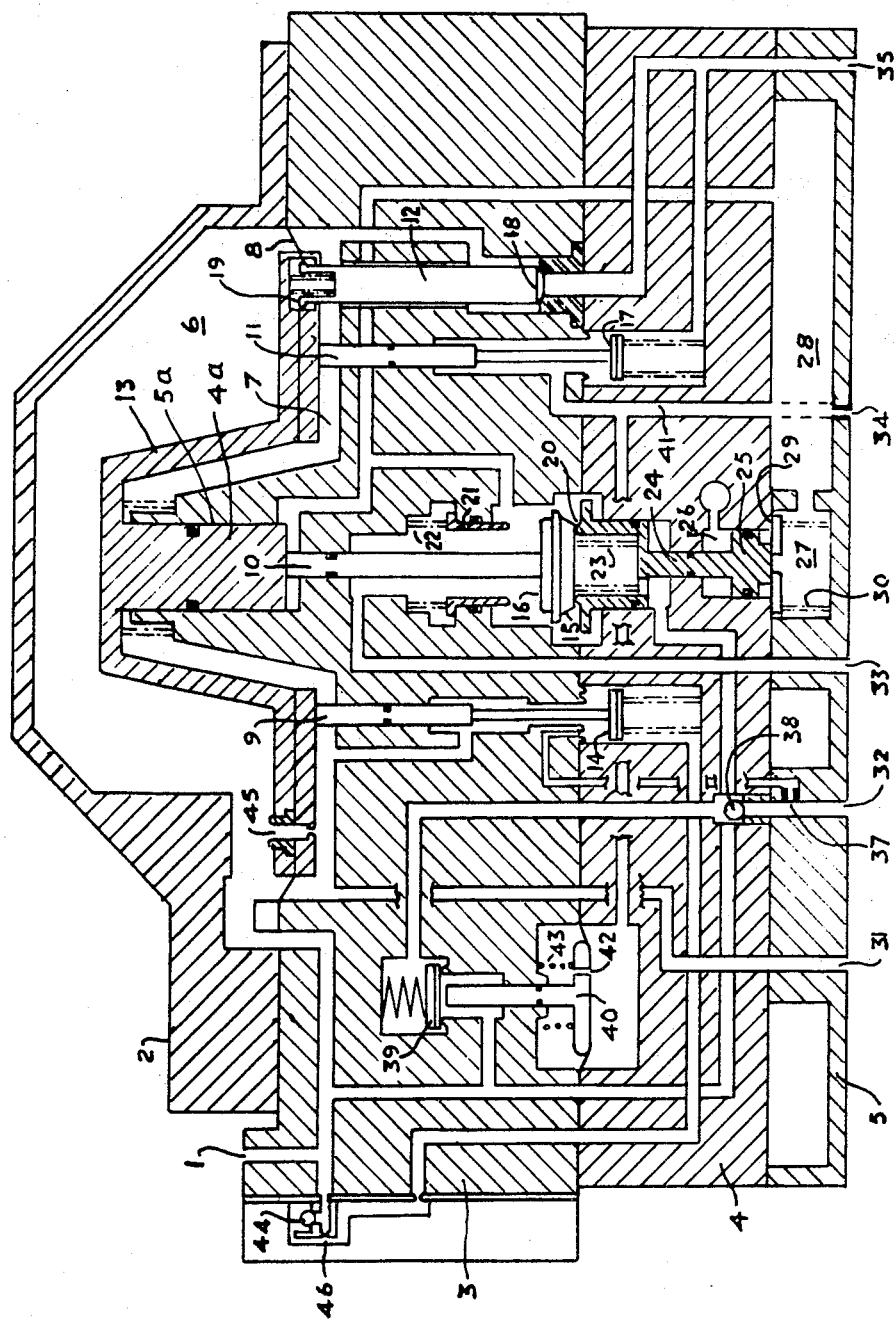

BRAKE CONTROL VALVE APPARATUS

This invention relates to brake control valve apparatus and relates particularly to the provision of an improved form of accelerated release in such apparatus.

The invention is applicable more especially to so called triple valve apparatus for controlling the brakes of a train in which a number of such valves are connected to a brake pipe which passes down the train. In normal operation of such a triple valve, the brakes are held off by a predetermined brake pipe pressure and at the same, time an auxiliary reservoir is charged to a pressure which is approximately equal to the brake pipe pressure. In order to apply the brakes fluid pressure is released from the brake pipe and a pressure responsive member in the valve apparatus is displaced to allow auxiliary reservoir pressure to be transmitted to the brake cylinders until a point is reached at which the apparatus laps off. In order subsequently to release the brakes the brake pipe pressure is recovered to its release value but owing to the length of the brake pipe, this recovery tends to be subject to a propagation delay down the train and a resultant uneven release of the brakes may tend to occur. The invention is concerned with improved means for possibly alleviating this tendency and enabling quicker release.

According to the present invention there is provided fluid operable brake control valve apparatus having brake cylinder valve means for controlling the supply of fluid pressure into and out of a brake cylinder said valve means being operable by a main pressure responsive member movable in response to changes of pressure when applied to a brake pipe, and accelerated release valve means operable in response to release of fluid pressure from the brake cylinder to connect a charged accelerated release reservoir to the brake pipe to assist a change of pressure in the brake pipe causing such release.

The accelerated release valve means may be operable by a further pressure responsive member one side of which is subject to pressure in a brake cylinder exhaust passage and the other side of which communicates with the one side through a choke, the member being normally biassed towards a position in which the accelerated release valve is closed.

In the foregoing, it is to be understood that pressure applied to the brake pipe may be in the form of a reduced pressure or in the form of an increased pressure, although it will be appreciated that in most accepted forms of railway braking equipment, a brake application is achieved by applying reduced pressure to the brake pipe.

In order that the present invention may be more clearly understood and readily carried into effect, the same will be further described by way of an example with reference to the accompanying drawing which illustrates in schematic form a brake control valve apparatus which makes use of one embodiment of the invention.

The apparatus shown in the drawing consists essentially of a triple valve connected to a brake pipe at a port denoted by the reference 1 and the apparatus comprises four main body sections 2, 3, 4 and 5 which are bolted with unshown bolts together with suitable intermediate seals, not shown, to complete the unit.

Within the upper portion 2, there is provided a pressure responsive member 13 having a main stem 4a which is slidable within a guide or passage in the section 3. Separation between the air volumes 6 and 7 on either side of the pressure responsive member is achieved by the provision of a diaphragm 8 clamped firstly into the pressure responsive member and secondly between the portions 2 and 3 referred to above, sufficient flexibility in the diaphragm being provided to permit unimpeded movement of the pressure responsive member.

The pressure responsive member 13 operably engages four principle valve stems denoted by references 9, 10, 11 and 12 respectively, the first three being sealingly slidable in the housing. Stem 9 carries an auxiliary reservoir charging valve and accelerated release reservoir charging valve dual closure member 14 operable to close off two concentric valve seats. Stem 10 carries a bulb inlet valve closure member 15 and a bulb exhaust valve closure member 16, stem 11 carries a brake cylinder exhaust valve closure member 17 and stem 12 itself constitutes a brake cylinder inlet valve closure member at its seating end portion 18. Additionally, it will be noted that the valve stem 12 is mounted to provide a certain amount of lost motion in the pressure responsive member 13 and is urged downwardly by a suitable internally provided housed spring 19 as shown. Each of the above mentioned valve closure members or portions has associated valve seats which do not require enumerating in themselves. Particular attention may be drawn to the bulb inlet valve seat 20 and the slidable bulb exhaust valve seat 21 each of which are sealingly slidable within the housing between upper and lower stops. The requirements for the relative spacings of the valve seats under various conditions will be appreciated when the operation of the apparatus is considered in more detail. The sliding seat 21 is urged downwardly by a light spring 22 and the seat 20 is provided with a light spring 23 which is engagable with the respective closure member 15 as 15 approaches the closed position. Further, the sliding seat 20 is connected via a sealingly slidable connecting rod 24 to a piston 25 which is slidable in a cylinder 26 an upper volume of which is vented to atmosphere and a lower volume of which communicates with a chamber 27 connected to the quick service bulb capacity 28 of the apparatus. In the stable released position of the apparatus as shown, the piston 25 rests against a lower stop 29 which is normally supported by a suitably strong spring 30 in the housing.

In addition to the brake pipe port 1, the apparatus is provided with a port 31 for connection to an auxiliary reservoir, a port 32 for connection to an accelerated release reservoir, exhaust ports 33 and 34 and a brake cylinder connection port 35. It will be seen moreover that the accelerated release reservoir port 32 is connectable through choke 37, via an inlet valve with closure member 14 in the unseated condition thereof to the auxiliary reservoir. The accelerated release reservoir is thereby chargeable from the brake pipe. The accelerated release reservoir is further connected via a one-way check valve 38 to the input side of an accelerated release valve having a spring loaded closure member 39 this closure member being operable by a pressure responsive member 40 which is subject on the lower side to the pressure of a brake exhaust passage 41 and the other side of the pressure responsive member 40 is connected only through a small choke 42 to the lower side. This member 40 is further urged downwardly by a suitable spring 43.

Referring now to the other principal connections in the apparatus, the brake pipe port 1 is connected to the upper chamber 6 of the apparatus, the input side of the bulb inlet valve, the output side of the accelerated release valve having movable member 39 and also via a check valve 44 to the input side of the auxiliary reservoir and accelerated release reservoir charging valve having closure member 14. The output side of the auxiliary reservoir charging valve is connected to the chamber 7 beneath the pressure responsive member and this chamber is further connected to the auxiliary reservoir port 31 and to the input side of the brake cylinder inlet valve having closure member 18. The output side of the brake cylinder inlet valve is connected of course to the brake cylinder port 35. This port is also connected to the brake cylinder exhaust valve having closure member 17 the exhaust side of which is connected to the exhaust port 34 which is provided with a certain restriction enabling utilization of a proportion of brake cylinder exhaust air in other directions to effect accelerated release.

The quick service bulb capacity 28 is connected on the one hand to the lower area of the main stem 4a of the pressure responsive member and on the other nand to the chamber within which the closure members 15 and 16 of the bulb inlet and exhaust valves operate. Communication is thereby provided between the bulb and the brake pipe on parting of the closure member 15 and the valve seat 20.

A small restricted passage is provided at 45 through the pressure responsive member 13 and a similar passage is provided at 46 between the brake pipe and auxiliary reservoir. These passages are present for providing requisite long term pressure stability in the apparatus.

Considering the operation of the apparatus in general terms, it may be understood initially that the operation is in many respects substantially the same as that which occurs in previously known forms of triple valve. Thus, an unoperated state or release state of the brakes, is maintained by a predetermined brake pipe pressure above atmosphere being established at 1. Under these conditions, the main pressure responsive member and its stem 4a are in a position such as that shown in the drawing, where the brake cylinder is exhausted and the auxiliary reservoir is charged from the brake pipe to a substantially identical pressure. A brake application is achieved by a drop of brake pipe pressure and this permits air to be transmitted from the auxiliary reservoir into the brake cylinder up to the point at which a pressure drop occurs in the auxiliary reservoir to permit the apparatus to lap-off and to interrupt flow of air to the brake cylinder. The degree of braking pressure applied to the brake cylinder is dependent upon the reduction of brake pipe pressure which is initiated.

As mentioned above, the drawing shows the valve in the stable release position and with the apparatus fully charged from the brake pipe the auxiliary and brake pipe pressures are equal. There is in this position a resultant downward pressure on the pressure responsive member 13 due to the fact that the underside of the main stem 4a is at atmospheric pressure, the bulb inlet valve member 16 being separated from its associated seat 21. The pile comprising 13, 4a, 10, 16, 15, 20, 24 and 25 is therefore supported by the lower housed spring 30, the quick service inlet valve closure member 15 resting against its seat 20 and the brake cylinder inlet valve 18 being closed. Also, the accelerated release valve 39 is closed, the actuating member 40 thereof being in its stable lower position as shown owing to the thrust of spring 43. The auxiliary reservoir charging valve 14 is open. The brake cylinder exhaust valve 17 is open and since as mentioned above, the quick service exhaust valve member 16 is off its seat, the chamber 27 is at atmospheric pressure and no pressure is thereby exerted on the piston 25.

When the brake pipe pressure is reduced to apply the brake and as soon as the pressure difference which subsequently acts upwards across the pressure responsive member 13 overcomes the resultant downward force mentioned above, the pressure responsive member 13 moves upwards followed under the influence of spring 23, by the valve closure members 15 and 16 unseating the bulb inlet valve. Brake pipe pressure therefore flows into the bulb capacity 28 accelerating the movement of the pressure responsive member and closing in sequence the charging valve 14, the brake cylinder exhaust valve 17 and the quick service exhaust valve.

Following closure of the quick service exhaust valve, bulb pressure flows to the under side of the piston 25, and since the upper area of this piston is subjected only to atmospheric pressure, there is a resultant upward force which carries the slidable valve seat 20 upwards against the upper stop. Continued movement moreover of the pressure responsive member in an upward direction lifts the sliding valve seat 21 upwards towards its upper stop. Continued upward movement of the pressure responsive member 13 causes the brake cylinder inlet valve 18 to open to make a brake application by connecting the auxiliary reservoir to the brake cylinder port 35 until the auxiliary reservoir pressure descends to approximately the pressure in the brake pipe whereupon the pressure responsive member 13 moves downwards to close off the brake cylinder inlet valve 18. Stability in the lap position is then provided by the quick service bulb pressure acting on the quick service valve member 15 and the valve seat 21.

In order to release the brakes, the brake pipe pressure is increased above the auxiliary reservoir pressure by about 1½ p.s.i. to overcome the resistance of the air load on the seat 21 and the valve members 15 and 16 can then commence to move downwards followed by the member 21. Valve closure member 16 cannot unseat until the member 21 comes against its lower stop. Owing to the upward movement of the inlet valve seat 20 referred to above in response to bulb pressure, the closure member 15 engages the seat 20 before disengagement between the seat 21 and its closure member 16 occurs. This prevents the connection of the brake pipe to a bulb capacity which is venting via the bulb exhaust valve during the release operation where the brake pipe pressure is required to be increasing.

Once the closure member 16 separates from its seat when the member 21 reaches its lower stop, bulb pressure is vented, the upward force on the pile is reduced and the whole assembly descends rapidly being assisted by the venting of the area under the stem 4a and also by the fact that the bulb pressure which was previously applied to the piston 25, is now removed. During this downward movement, the brake cylinder exhaust valve 17 and the auxiliary reservoir charging valve 14 are opened and the assembly comes to rest on the lower stop 29 presented above the spring 30. It will be appreciated that the downward movement in practice is so rapid that overshoot can occur to the extent that the spring 30 may be depressed and final extreme stop position being provided by the lower stop for the member 20. However, the assembly returns to the position shown and the pressures in the brake pipe and the auxiliary reservoir recover to substantially their starting values.

Referring now to the accelerated release feature of the apparatus, the accelerated release reservoir connected at 32 but not shown is charged from the brake pipe via choke 37 when the charging valve closure member 14 is open, that is in the brake release position of the apparatus. When during release after a brake application, the brake cylinder exhaust valve 17 opens, the passage between the brake cylinder exhaust valve 17 and the lower side of the pressure responsive member 40 is temporarily pressurized by brake cylinder exhaust air and the pressure responsive member 40 moves upwards thereby temporarily unseating the valve closure member 39 to permit the passage of air from the accelerated release reservoir through the port 32 via check valve 38 to the brake pipe which at the time considered is at a lower pressure. This supplements the rise of brake pipe pressure which has been started by the brake control value and assists in rapid transmission of brake release from one such apparatus to the next such apparatus connected to the same brake pipe in a train. The pressures on either side of the pressure responsive member 40 equalize fairly rapidly by virtue of the choke 42 and the valve closure member 39 is thereby quickly reclosed so that the flow of air from 32 to the brake pipe for accelerated release is only of short duration.

In the manner of operation of accelerated release in the present embodiment, it will be appreciated that the accelerated release is piloted from the movement of the pressure responsive member 13 and conditional upon the actual commencement of brake release owing to the fact that it is brake cylinder exhaust air which is utilized to cause the temporary unseating of the valve 39.

Having thus described our invention what we claim is:

1. Fluid operable brake control valve apparatus comprising brake cylinder valve means for controlling the supply of fluid pressure into and out of a brake cylinder, a main pressure responsive member movable in response to changes of pressure when applied to a brake pipe for operating said valve means, and an accelerated release valve operable in response to release of fluid pressure from the brake cylinder to connect a charged reservoir to the brake pipe to assist a change of pressure in the brake pipe causing such release.

2. Fluid operable brake control valve apparatus as claimed in claim 1 comprising a further pressure responsive member for operating said accelerated release valve, one side of which further pressure responsive member is subject to pressure in a brake cylinder exhaust passage and the other side of which communicates with the one side through a choke, and means normally biassing the further pressure responsive member towards a position in which the accelerated release valve is closed.

3. Fluid operable brake control valve apparatus as claimed in claim 2, including valve means for charging the accelerated release reservoir from an auxiliary reservoir for the valve apparatus in the release position of the main pressure responsive member.

* * * * *